United States Patent
Krenzer (10) Patent No.: US 8,944,729 B2
(45) Date of Patent: Feb. 3, 2015

(54) TOOL FOR MACHINING WORKPIECES

(75) Inventor: Ulrich Krenzer, Zirndorf (DE)

(73) Assignee: Mapal Fabrik fur Prazisionswerkzeuge Dr. Kress KG (DE)

( * ) Notice: Subject to any disclaimer, the term of this patent is extended or adjusted under 35 U.S.C. 154(b) by 983 days.

(21) Appl. No.: 12/739,208

(22) PCT Filed: Oct. 21, 2008

(86) PCT No.: PCT/EP2008/008896
§ 371 (c)(1),
(2), (4) Date: Apr. 22, 2010

(87) PCT Pub. No.: WO2009/053028
PCT Pub. Date: Apr. 30, 2009

(65) Prior Publication Data
US 2011/0036225 A1    Feb. 17, 2011

(30) Foreign Application Priority Data
Oct. 23, 2007  (DE) .......................... 10 2007 050 471

(51) Int. Cl.
B23B 51/02 (2006.01)
B23B 51/06 (2006.01)

(52) U.S. Cl.
CPC ................ B23B 51/02 (2013.01); B23B 51/06 (2013.01); *B23B 2251/02* (2013.01); *B23B 2251/50* (2013.01); *Y10S 408/713* (2013.01)
USPC .............. 408/230; 408/713; 408/59; 408/232

(58) Field of Classification Search
CPC  B23B 2251/02; B23B 51/02; B23B 2205/02; B23B 51/06; B23B 2251/50
USPC ........... 408/56, 231, 232, 233, 226, 713, 230, 408/227, 228, 229, 239 R, 238, 240, 57, 59, 408/60, 61
See application file for complete search history.

(56) References Cited

U.S. PATENT DOCUMENTS 5,904,455 A * 5/1999 Krenzer et al. ............... 408/144
5,957,631 A   9/1999 Hecht ........................... 408/144
(Continued)

FOREIGN PATENT DOCUMENTS

EP  1 864 733 A1  12/2007
EP  1 892 070 A    2/2008
(Continued)

OTHER PUBLICATIONS

International Search Report dated Jan. 14, 2009, issued in corresponding international application No. PCT/EP2008/008896.
(Continued)

*Primary Examiner* — Eric A Gates
*Assistant Examiner* — Paul M Janeski
(74) *Attorney, Agent, or Firm* — Ostrolenk Faber LLP (57) ABSTRACT

A tool for machining workpieces, having a shank and a cutting insert having a base body held in the shank. The shank has a slot accommodating the cutting insert. The body has a central section with a central axis. At least one convexly bowed centering surface running in the direction of the central section. At least one drive element originates from the central section. The slot in the shank has at least one interior surface region shaped to cooperate with the at least one centering surface.

14 Claims, 5 Drawing Sheets

(56) References Cited

U.S. PATENT DOCUMENTS

| | | | |
|---|---|---|---|
| 5,988,953 A * | 11/1999 | Berglund et al. | 408/1 R |
| 6,481,938 B2 * | 11/2002 | Widin | 408/226 |
| 6,530,728 B2 * | 3/2003 | Eriksson | 408/233 |
| 6,551,035 B1 * | 4/2003 | Bruhn et al. | 408/144 |
| 6,817,429 B2 * | 11/2004 | Sollami | 175/420.1 |
| 6,840,717 B2 * | 1/2005 | Eriksson | 408/1 R |
| 7,008,150 B2 * | 3/2006 | Krenzer | 408/144 |
| 7,309,196 B2 * | 12/2007 | Ruy Frota de Souza | 408/227 |
| 7,407,350 B2 * | 8/2008 | Hecht et al. | 408/231 |
| 7,950,881 B2 * | 5/2011 | Stokey et al. | 408/230 |
| 8,371,778 B2 * | 2/2013 | Stokey et al. | 408/233 |
| 2008/0047759 A1 | 2/2008 | Koch | |
| 2008/0193237 A1 * | 8/2008 | Men et al. | 408/226 |
| 2010/0322728 A1 * | 12/2010 | Aare | 408/200 |
| 2010/0322729 A1 * | 12/2010 | Pabel | 408/200 |

FOREIGN PATENT DOCUMENTS

| | | |
|---|---|---|
| JP | 2005-186199 | 7/2005 |
| JP | 2006123078 A * | 5/2006 |
| JP | 2006-167871 | 6/2006 |
| RU | 1776497 A1 | 11/1992 |
| RU | 20477 | 11/2001 |
| SU | 1151374 A | 4/1985 |
| WO | WO 84/03241 | 8/1984 |
| WO | WO 2005/115667 | 8/2005 |
| WO | WO 2006/046227 A | 5/2006 |
| WO | WO 2006/104239 | 10/2006 |

OTHER PUBLICATIONS

English language translation of the Notification of Transmittal of Translation of the International Preliminary Report on Patentability (Chapter I or Chapter II) of the Patent Cooperation Treaty)(Form PCT/IB/338) and International Preliminary Report on Patentability (Chapter II of the Patent Cooperation Treaty)(Form PCT/IPEA/409) mailed Sep. 10, 2010 in corresponding International Application No. PCT/EP2008/008896.

Office Action dated Feb. 5, 2013 issued in corresponding Japanese Patent Application No. 2010-530323 with English translation.

* cited by examiner

TOOL FOR MACHINING WORKPIECES

CROSS REFERENCE TO RELATED APPLICATION

The present application is a 35 U.S.C. §§371 national phase conversion of PCT/EP2008/008896, filed Oct. 21, 2008, which claims priority of COUNTRY Application No. 10 2007 050 471.5, filed Oct. 23, 2007, incorporated by reference herein. The PCT International Application was published in the German language.

BACKGROUND OF THE INVENTION

The invention relates to a tool for machining workpieces.

The tools referred to here are those which are used for machining workpieces and are preferably designed as drills. They comprise a shank and a cutting insert interchangeably held by said shank. To accommodate the cutting insert, the shank is provided with a slot, into which the cutting insert is inserted. Tools having interchangeable cutting inserts replace conventional tools, in particular twist drills, which are produced throughout from a high-temperature-resistant cutting material, for example carbide or high-speed steel. When this drill becomes worn, the cutting edges are reground as often as possible or are redressed. At the same time, the cutting region is also recoated as a rule. The coating thicknesses and coating inherent stresses increasing in the process prevent frequent redressing of the twist drills. To avoid this disadvantage, tools having a shank and cutting inserts interchangeably held by said shank have been created. It has been found that such modular tools can be produced only with difficulty and at considerable cost. In this case, tools have also been proposed in which the cutting insert is fixed on the shank by additional fastening elements, in particular screws. Exchanging the cutting insert, in particular in restricted space conditions, is very awkward. Modular tools which do not need such fastening elements have also been proposed, but said modular tools do not have sufficient stability and in particular are unable to reliably absorb the forces that occur during the machining of workpieces (WO 84/03241).

SUMMARY OF THE INVENTION

The object of the invention is therefore to provide a tool of the type referred to here which is of simple construction and is very stable.

To achieve this object, a tool for machining workpieces of the abovementioned type is proposed. It comprises a tool for machining workpieces, having a shank and a cutting insert having a base body held in the shank. The shank has a slot accommodating the cutting insert. The body has a central section with a central axis. At least one convexly bowed centering surface running in the direction of the central section. At least one drive element originates from the central section. The slot in the shank has at least one interior surface region shaped to cooperate with the at least one centering surface.

As in the known modular tools, the tool is provided with a shank which has a slot. Interchangeably inserted into the latter is a cutting insert having a basic body. The tool is characterized by the fact that the basic body, in a central section, is provided with a convexly curved centering surface which runs in the direction of its center axis. At least one driver emerges from this central section. The centering surfaces of the central section form sectional areas of an imaginary lateral surface of a conical section. They therefore run conically toward the front side of the tool. The basic body of this cutting insert is thus of very compact construction. It is centered in the slot of the shank by the convexly curved centering surfaces of the central section in such a way that very high transverse forces, as occur during the conventional cutting of workpieces, can be reliably absorbed.

In an especially preferred exemplary embodiment, the basic body comprises drivers which emerge from the central section and are preferably arranged on opposite sides of the central section. This also ensures that the cutting insert is securely held in the shank.

Especially preferred is an exemplary embodiment which is characterized by the fact that each driver has a driving surface which encloses an acute angle with a plane in which the center axis of the basic body lies. In this case, the two driving surfaces converge in the direction of the front side of the tool from different sides toward this plane. This configuration is characterized by the fact that the cutting insert is held especially securely in the shank of the modular tool.

A further especially preferred exemplary embodiment is characterized by the fact that a coolant/lubricant supply is provided and that a coolant/lubricant passage is provided in the contact region between the outer side of the cutting body and the inner surface of the slot, accommodating said cutting body, in the shank, via which coolant/lubricant passage the at least one geometrically defined cutting edge can be supplied with coolant/lubricant. Since the cutting insert itself is not weakened by any cooling/lubricant passages, the tool is characterized by high stability.

BRIEF DESCRIPTION OF THE DRAWINGS

The invention will be explained below with reference to the drawings, in which:

FIG. 3 shows the shank of the tool without cutting insert, in side view in FIG. 3a and in end view in FIG. 3b;

FIG. 4 shows the cutting insert in end view in FIG. 4a and in two side views in FIGS. 4b and 4c, and FIG. 5 shows an exemplary embodiment of the tool with a coolant/lubricant passage in end view in FIG. 5a and in sectional view in FIG. 5b.

DESCRIPTION OF EMBODIMENTS

Figure 1:
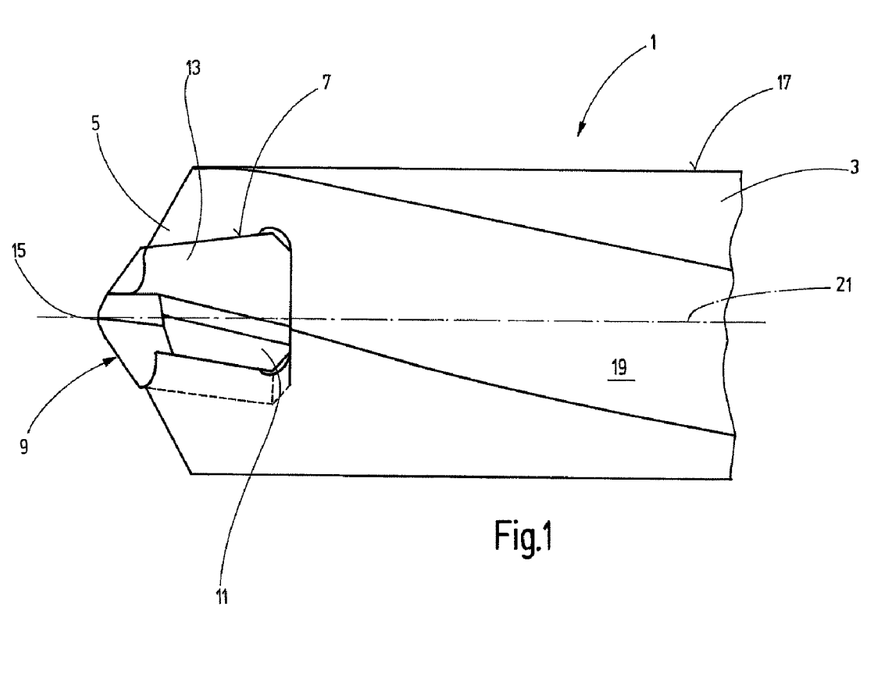
FIG. 1 shows the front part of the tool with a cutting insert in side view.

The front part of a tool 1 for machining workpieces is shown in FIG. 1 in side view. Here, this is a tool designed as a twist drill and having a shank 3 which is provided with a slot 7 in the region of its front end 5, said slot 7 accommodating a cutting insert 9. The basic body 11 of the cutting insert 9 comprises a central section 13, which is also designated as a core and which, as explained in more detail below, has conically designed regions which taper in the direction of the front side 15 of the tool 1. Preferably incorporated in the circumferential surface 17 of the shank 3 is a flute 19, which here, facing the viewer in FIG. 1 and relative to the rotation or center axis 21, runs along an imaginary helical line. It is also conceivable for said flute to be formed parallel to the center axis 21.

The shank 3 of the tool 1 is shown truncated in FIG. 1. At its end opposite the front side 15 of the tool 1, it can be designed in any desired manner and for different types of fastening.

Figure 2:
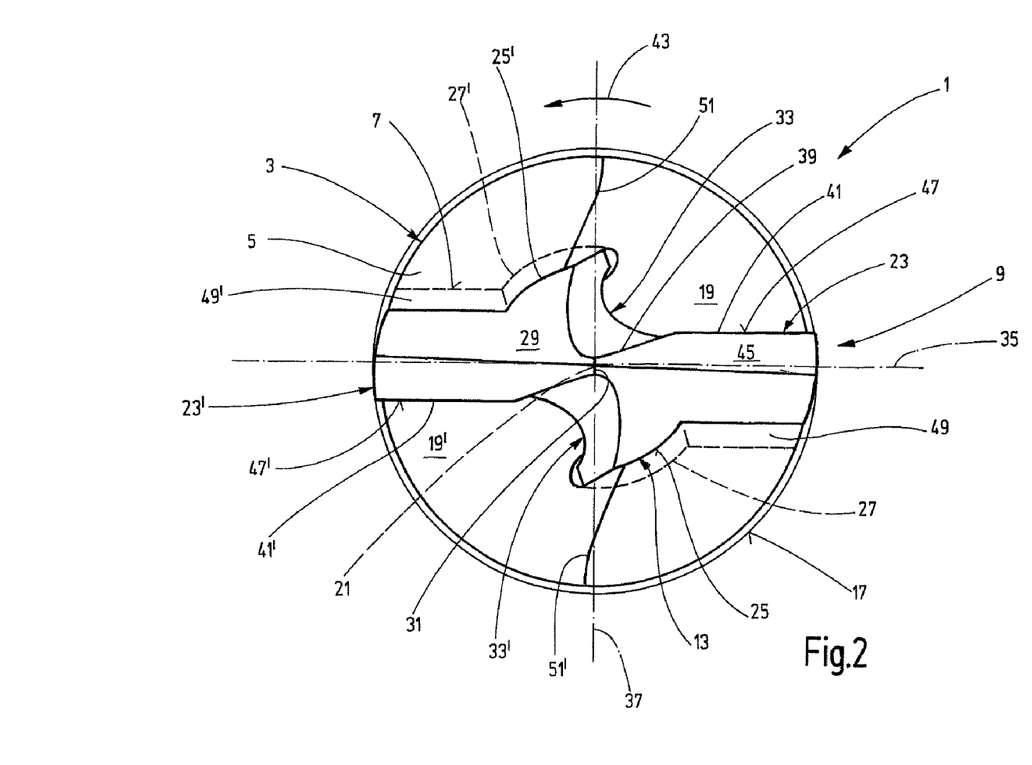
FIG. 2 shows the tool with cutting insert in end view.

The tool shown in FIG. 1 is reproduced in end view in FIG. 2. The same parts are provided with the same reference numerals, and so reference is made in this respect to the preceding description.

The tool therefore has a shank 3 in which a slot 7 is incorporated in its front end 5, the cutting insert 9 being inserted into said slot 7. In the plan view, it can be seen that the cutting insert 9 has a central section 13, from which at least one driver 23 emerges. In the tool 1 shown here, the cutting insert 9 is designed to be centrosymmetric to the center axis 21. It therefore has two identical drivers 23 and 23' originating on opposite sides of the central section 13. The central section 13 has a center axis which, as can be seen from FIG. 1, coincides with the center axis 21 of the tool 1. It has at least one, here two opposite centering surfaces 25 and 25' which run substantially in the direction of the center axis 21 and which are convexly curved and, as can be seen from FIG. 1, are sectional areas of an imaginary lateral surface of a conical section, said lateral surface tapering toward the front side 15 of the tool 1. This is indicated by the broken lines 27, 27' in FIG. 2.

The cutting insert 9 has at least one geometrically defined cutting edge, by means of which chips are removed from a workpiece. To this end, a relative rotation between workpiece and tool 1 is necessary. As a rule, the tool 1 is set in rotation relative to a stationary workpiece.

A chisel edge 31 intersecting the center axis 21 at an angle can be seen on the end face 29 of the cutting insert 9, the length of said chisel edge 31 being defined by thinned portions 33, 33'. That region of the cutting insert 9 which lies above an imaginary horizontal line 35 which is intersected by an imaginary vertical line 37 in the region of the center line 21 is dealt with below. It can be seen that a center cutting edge 39 starts from the chisel edge 31, and this center cutting edge 39 runs at an acute angle to the horizontal line 35 and merges here into a main cutting edge 41 of the cutting insert 9, with a bend being formed. The configuration described here with the cutting insert 9 in the region of the end face 29 is basically known so that no further detail is needed here. For clarification, reference is also made to the fact that the bottom region of the cutting insert 9, that is to say that region which lies below the horizontal line 35, is designed to be centrosymmetric.

Chips removed by the center and main cutting edges 39, 41 pass into the chip space formed by the flute 19 and can be carried away. During the machining of a workpiece, the tool 1 in the view according to FIG. 2 rotates counterclockwise, as indicated by an arrow 43.

It becomes clear from FIG. 2 that the shank 3 of the tool 1 is also designed to be centrosymmetric and accordingly has a second flute 19', which likewise serves to receive chips which arise during the machining of a workpiece. In the region of the end face 29, a flank 45 is provided such as to adjoin the center cutting edge 39 and the main cutting edge 41, said flank 45 falling away at an acute angle from said cutting edges, into the image plane of this illustration in FIG. 2.

On their front side, which points in the direction of rotation indicated by the arrow 43 and falls away perpendicularly or at an acute angle into the image plane of FIG. 2, each driver 23, 23' has a rake face 47, 47', on which the chips removed by the main cutting edge 41, 41' run off. The chips removed by the center cutting edge 39 run off on the surface of the thinned portion 33.

On their side opposite the rake faces 47, 47', the drivers 23, 23' have driving surfaces 49, 49', which run substantially parallel to a plane in which the center axis 21 of the tool 1 and also the imaginary horizontal line 35 lie. In the exemplary embodiment of the tool 1 shown here, the driving surfaces 49, 49' are inclined and are arranged on opposite sides of the imaginary plane, that is to say of the horizontal line 35, and converge in the direction of the front side 15, that is to say in the direction of the end face 29 of the cutting insert 9. Due to this configuration and due to the conical centering surfaces 25, 25' of the central section 13, the cutting insert 9 is reliably held in the shank 5 of the tool 1 when the latter is pulled out of a drilled hole in a workpiece.

It can be seen from the illustration according to FIG. 2 that at least one flute 19 and here therefore the two flutes 19 and 19' have a boundary wall 51, 51'. In FIG. 2, the cutting insert 9 is shown in its position fixed in the shank 3. To exchange the cutting insert 9, said cutting insert is rotated relative to the shank 3 of the tool 1, and so it performs a rotation relative to the shank 3, to be precise in the direction of the arrow 43. The relative rotation is possible until the rake faces 47, 47' of the cutting insert 9 strike the boundary walls 51, 51' and prevent further rotation. In this end position defined by the stop, the cutting insert 9 can be removed from the shank 3 by being pulled out in the direction of the center axis 21. In the process, it moves toward the viewer in the end view according to FIG. 2.

It becomes clear that the cutting insert 9 can be exchanged very easily because it merely requires a relative rotation between said cutting insert 9 and the shank 3 of the tool 1. During a counterclockwise rotation according to arrow 43 in FIG. 2, the cutting insert 9 is released and can be pulled off in the axial direction. When the cutting insert is being inserted, it is introduced into the slot 7 of the shank 3 in such a way that its rake faces 47, 47' bear against the boundary walls 51, 51'. After the cutting insert 9 has been inserted, it can be rotated clockwise against the arrow 43 in FIG. 2 relative to the shank 3 of the tool 1 and can be shifted into the fitted position according to FIG. 2.

Since the drivers 23, 23' are pressed against the driving surfaces 49, 49' when a workpiece is being machined, no fastening means are required in order to fix the cutting insert 9 to the shank 3 of the tool 1. Even when the tool 1 is being pulled out of a drilled hole, the cutting insert 9 is fixed in the shank 3 of the tool 1 on account of the configuration of the driving surfaces 49, 49' and on account of the conical configuration of the central section 13.

Figure 3A:
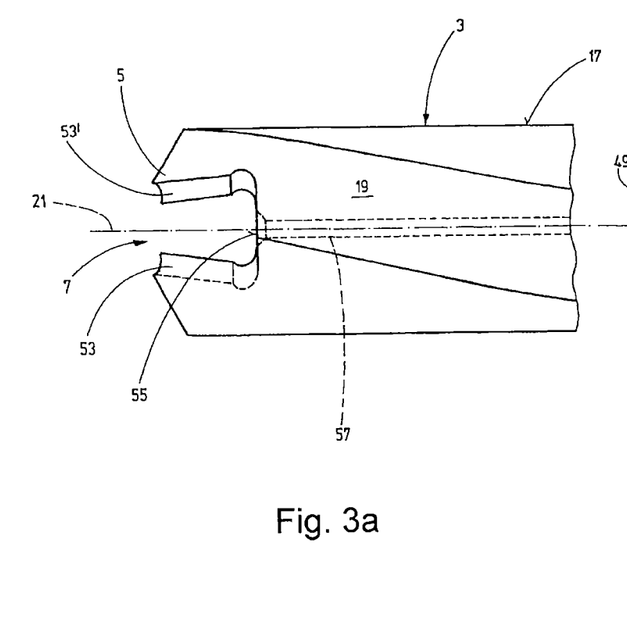

FIG. 3 shows the shank 3 of the tool explained with reference to FIGS. 1 and 2, although without the cutting insert 9. The same parts are provided with the same reference numerals, and so reference is made in this respect to the preceding description. At its front end 5, the shank 3 has a slot 7 which serves to interchangeably accommodate the cutting insert 9. The truncated front part of the tool 1 can be seen on the left in FIG. 3a. Since the cutting insert 9 is absent, the interior of the slot 7 can be seen, in particular an inner surface region 53 (indicated by a broken line) below the center line 21 and an inner surface region 53' above the center line 21. Especially here, it becomes clear that the inner surface regions 53, 53' are of concave design and are matched to the centering surfaces 25, 25' of the cutting insert 9 in such a way that they have the same radius of curvature and are likewise arranged at an angle in the direction of the center axis 21. This angle opens to the right in FIG. 3a, and so that inner surface regions 53, 53' taper in the direction of the front side 5 of the shank 3; they therefore form, like the centering surfaces 25, 25', sectional areas of an imaginary lateral surface of a conical section, said lateral surface tapering in the direction of the front side 15 of the tool 1.

The shank 3, as in FIG. 1, is shown in side view in FIG. 3a. It can be seen that the root 55 of the slot 7 is designed to be flat and runs substantially perpendicularly to the center axis 21. It is intersected by the at least one flute 19, by both flutes 19 and 19' in the exemplary embodiment of the tool 1, as described here.

The cutting insert 9 bears against the root 55. When a workpiece is being machined, the axial forces that occur, that is to say the forces acting in the direction of the center axis 21, are absorbed by the shank 3 in this manner.

The tool 1 is preferably connected to a coolant/lubricant passage, via which fluid is directed to the active cutting edges of the cutting insert 9 when a workpiece is being machined. In the exemplary embodiment of the tool shown here, the shank 3 has a coolant/lubricant passage 57 running concentrically to the center axis 21. It is also conceivable for a plurality of such passages to be provided. This passage opens in the region of the root 55, such that coolant/lubricant present here can reach the active cutting edges.

Figure 3B:
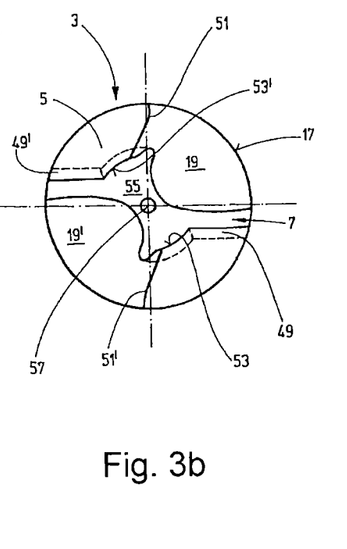

The shank 3 is shown in an end view on the right in FIG. 3b, in a similar manner to FIG. 2. However, the cutting insert 9 has been omitted here, and therefore the root 55 of the slot 7 can be seen, and also the orifice of the coolant/lubricant passage 57.

Figure 4A:
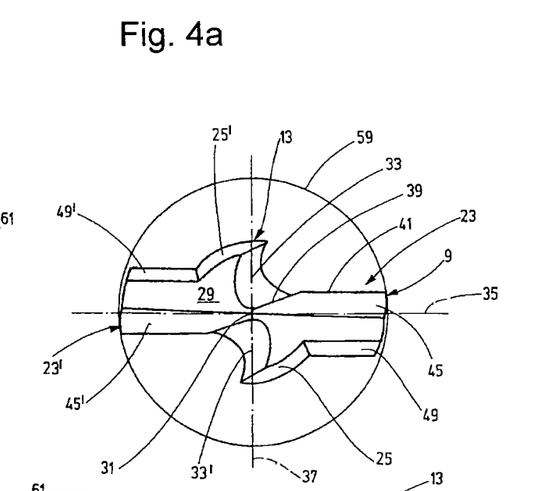
Figure 4B:
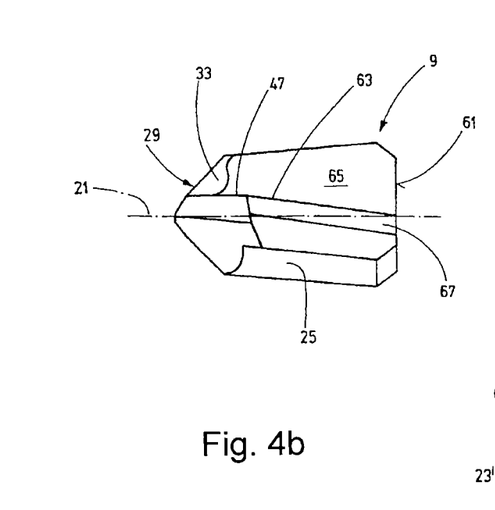
Figure 4C:
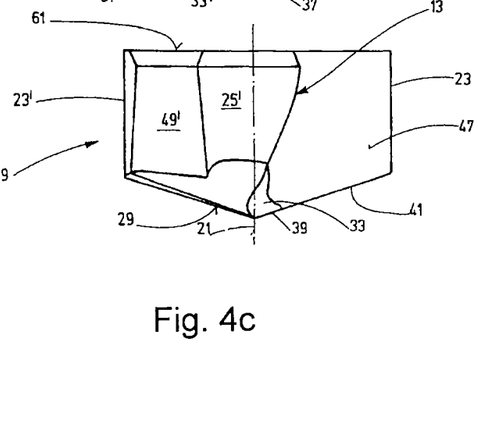

FIG. 4 shows the cutting insert 9 without the shank 3 of the tool 1, specifically at the top left in side view FIG. 4b as in FIG. 1 and at the top right in end view FIG. 4a as in FIG. 2. Here, a circle 59 indicates the circumferential surface of the absent shank. Below the end view there is another side view FIG. 4c of the cutting insert 9, which is rotated by 90° relative to the illustration FIG. 4b at the top left. The same parts are provided with the same reference numerals, and so reference is made in this respect to the preceding description.

It becomes clear at the top left in FIG. 4b that the base surface, opposite the end face, of the cutting insert is designed to be flat and runs substantially perpendicularly to the center axis 21. It serves as a bearing surface 61, with which the cutting insert 9 is supported on the root 55 of the slot 7 in the shank 3 when using the tool 1.

The cutting insert 9 of the tool 1 described here is distinguished by the fact that its basic body 11 has a central section 13 which is of conical design and which has at least one centering surface 25, 25'. The at least one centering surface 25, 25' therefore forms at least a region of the outer surface of the central section 13; it preferably extends up to the end face 29 of the cutting insert. It is therefore the basic body or central section itself which centers and also axially fixes the cutting insert 9 in the shank 3 of a tool. FIG. 4 in particular clearly shows that the cutting insert 9, in the region of its base surface, which serves as bearing surface 61, has no extensions of any kind which, as is the case in known tools, serve to fix the cutting insert 9 in the shank 3 of a tool 1. The cutting insert 9 is therefore, as measured in the direction of the center axis 21, designed to be very short, and therefore the depth of the slot 7, accommodating the cutting insert 9, in the shank 3 of the tool 1 can accordingly be relatively small. This leads to a very stable configuration of the entire tool 1 and also to the fact that the production of both the cutting insert 9 and the shank 3 is relatively simple and thus cost-effective.

Furthermore, it can also be seen that a coolant/lubricant supply is possible in a simple manner due to the simple construction of the cutting insert 9 and through the avoidance of any axially running extensions of the same: a coolant/lubricant passage 57 can open, as explained above, at the root 55 of the slot 7, explained with reference to FIG. 3b, of the shank 3.

The side view in FIG. 4b and the end view of FIG. 4a also show the thinned portion 33 and the main cutting edge 41, adjoining which is a secondary cutting edge 63. Chips removed by the latter pass into a chip space 65 which continues into the flute 19 in the shank 3. Adjoining the secondary cutting edge 63 is a supporting surface 67, via which the cutting insert 9 and thus the tool 1 are supported on the wall of a drilled hole.

At the top right end view in FIG. 4a, the cutting insert 9 is shown in end view, as stated. The end face 29, the chisel edge 31, the thinned portion 33, 33', the center cutting edge 39 and the main cutting edge 41 can clearly be seen.

The centering surfaces 25 and 25' of the central section 13 can be seen especially clearly here because they are not concealed by the material of the shank 3. This also applies to the driving surfaces 49 and 49' of the drivers 23 and 23' emerging from the central section 13.

The cutting insert 9 rotated by 90° relative to the illustration at the top left in FIG. 4 can be seen from the side view at the bottom right in FIG. 4c. The same parts are provided with the same reference numerals, and so reference is made to the preceding description. The rake face 47 adjoining the main cutting edge 41, the centering surface 25' of the central section 13, and the driving surface 49' of the driver 23' can clearly be seen here. The bearing surface 61, designed to be flat, of the cutting insert 9 can also be seen in this view. It is perfectly possible to incorporate recesses in the bearing surface 61 in order to provide a free space between the root 55 of the slot 7 and the bearing surface 61, via which free space a coolant/lubricant can pass right up to the active cutting edges of the cutting insert 9. It is also conceivable to provide channels in the root 55, which can be seen from FIG. 3a, of the slot 7, said channels running up to the orifice of the coolant/lubricant passage 57, in order to provide such a free space. In addition, channels can be provided both in the root 55 and in the bearing surface 61.

Here, the following becomes clear: the tool 1 is distinguished by the fact that the cutting edge 9 has, on its end opposite its end face 29, a base surface which serves as a bearing surface 61 and is supported on the root 55 of the slot 7 in the shank 3. A coolant/lubricant supply can be ensured by recesses, in particular channels, which are incorporated in the bearing surface 61 of the cutting insert 9 and/or in the root 55 of the slot 7 and run right up to the orifice of the coolant/lubricant passage 57. In this case, it is perfectly possible for the bearing surface 61 of the cutting insert 9 to bear reliably against the root 55 of the slot 7, such that forces introduced into the cutting insert 9 are passed into the shank 3 when a workpiece is being machined.

Owing to the fact that coolant discharges from the orifice of the coolant/lubricant passage 57 from a central supply and flows along the base surface of the cutting insert 9, very good cooling of the cutting insert 9 is ensured.

Comparing the side and end views of the cutting insert 9 in FIG. 4 shows that said cutting insert 9 is as wide as the diameter of the shank 3, but that the thickness thereof is smaller than the width.

It can also be seen that the central section 13 is designed to be conical and tapers in the direction of the end face 29 of the cutting insert 9 in order to ensure a reliable hold of the cutting insert 9 in the shank 3, the centering surfaces 25 and 25' of the central section 13 serving to hold the cutting insert 9 centrally in the shank 3 of the tool 1, even if pronounced transverse forces act on the cutting insert 9 when a workpiece is being machined. Since the centering surfaces 25, 25' are provided directly on the basic body 11 of the cutting insert 9, namely in the region of the central section 13, high forces can be absorbed because, in order to absorb such forces, the basic body 11 has no extensions or projections at all which start from the base surface thereof and would always be weaker than the basic body 11.

FIG. 5 show a modified exemplary embodiment of a tool 1. The same and functionally identical parts are provided with the same reference numerals, and so reference is made in this respect to the description with regard to FIGS. 1 to 4.

Figure 5A:
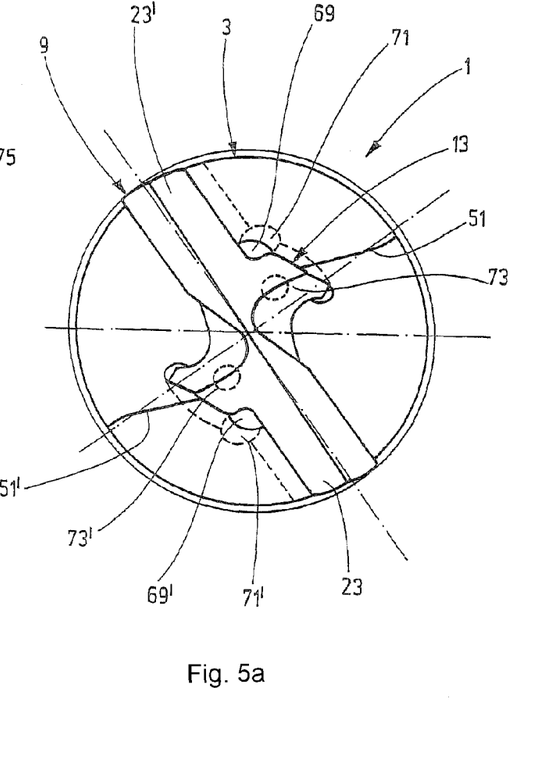

The tool 1 is reproduced in end view on the right in FIG. 5*a*. It is in this case rotated clockwise by about 45° compared with the illustration in FIG. 2. Inserted into the shank 3 is the cutting insert 9, which has a central section 13 and at least one, here two drivers 23, 23'.

The difference from the tool 1 described with reference to FIGS. 1 to 4 consists in the fact that a coolant/lubricant passage 69, 69' is formed in the contact region between the cutting insert 9 and the shank 3. This can be done, as shown on the right in FIG. 5, by a groove 71, 71' being incorporated in the inner surface of the slot 7, thereby producing a free space, thus the coolant/lubricant passage 69, between shank 3 and cutting insert 9. It is also perfectly conceivable to provide a recess in the cutting insert 9 or in both parts, that is to say both in the shank 3 and in the cutting insert 9, in order to realize such a coolant/lubricant passage 69.

In the exemplary embodiment shown in FIG. 5, the following preferably transpires:

Due to recesses starting from the orifice of the coolant/lubricant passage 57, coolant can flow along between the root 55 of the slot 7 in the shank 3 and the bearing surface 61 of the cutting insert 9. In addition, it flows through the coolant/lubricant passages 69 which run along the central section 13 of the basic body 11 of the cutting insert 9, thus practically over the entire height of the cutting insert 9. In this way, the base surface of the cutting insert 9 and in addition also the side and outer surfaces of the basic body 11 thereof are optimally cooled. The cutting insert 9 is therefore cooled not only in the region of its basic surface serving as bearing surface 61 but also laterally up to its end face 29. Since the discharges directly from the coolant/lubricant passage directly in front of the end face 29 of the cutting insert 9, provision is also made for especially good lubrication of the cutting edges of the same.

In addition, it is also conceivable to provide at least one, here two cooling/lubricant passages 73, 73' in the basic body 11 of the cutting insert 9, which cooling passage(s) passes (pass) through the basic body 11 of the cutting insert 9 and is (are) realized, for example, by bores indicated here by broken lines.

The at least one coolant/lubricant passage 69, 69' formed in the contact region between cutting insert 9 and shank 3 and the at least one coolant/lubricant passage 73/73' passing through the basic body 11 of the cutting insert 9 are connected to a free space between the cutting insert 9 and the root 55 of the slot 7 and thus to a coolant/lubricant passage 57 which passes through the shank 3, as was explained with reference to FIG. 3.

Figure 5B:
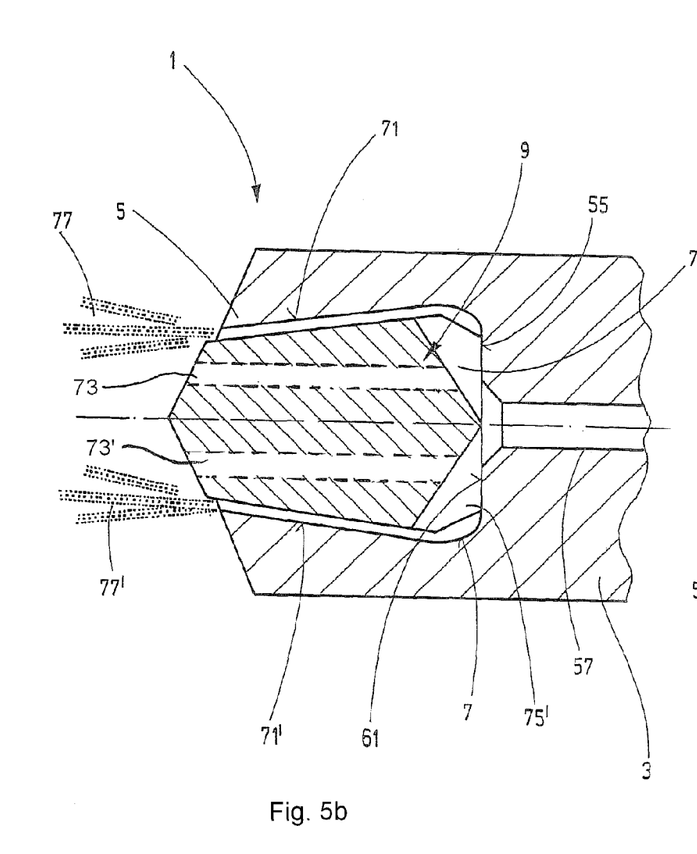

The foremost part of the tool 1 is shown in longitudinal section on the left in FIG. 5*b*. The same parts are provided with the same reference numerals, and so reference is made in this respect to the description with regard to the preceding figures.

It can be seen from the sectional illustration that the cutting insert 9 has, in the region of the bearing surface 61, at least one, here two grooves 75, 75', by means of which a free space is provided. The grooves are in fluidic connection with the coolant/lubricant passage 57 in the shank 3, and also with the grooves 71, 71' provided in the contact region between shank 3 and cutting insert 9, such that a coolant/lubricant delivered through the coolant/lubricant passage 57 in the shank 3 can pass via the free space, thus here via the grooves 75, 75', to the grooves 71, 71' and can discharge at the front from the tool 1, a factor which is only intimated by lines 77, 77'. Thus the active cutting edges of the cutting insert 9 can be cooled and lubricated. The coolant/lubricant also ensures that the chips removed by the cutting edges are reliably discharged via the flutes 19, 19' and do not impair the machined surface in the workpiece.

In the exemplary embodiment of the tool 1 shown in FIG. 5, too, the cutting insert 9 is inserted into the front side 5 of the shank 3 and fixed or released by a rotary movement, as was explained in detail with reference to FIG. 2. Here, too, no additional fastening means, for example screws or the like, are required in order to reliably anchor the cutting insert 9 in the shank 3 in such a way that transverse forces are passed from the basic body 11 of the cutting insert 9 into the slot 7 of the shank 3 and are reliably absorbed.

The invention claimed is:

1. A tool for machining workpieces, comprising
a shank,
a cutting insert configured to be received and held by the shank and to be removable from the shank, the insert having a basic body with an end face at an outward end thereof,
the shank having a front side with a slot therein shaped and configured to accommodate the cutting insert with the outward end of the insert out of the slot,
the basic body of the cutting insert having a central section having a center axis, the central section having at least one convexly curved centering surface extending substantially along the direction of and also being curved around the center axis,
each of the centering surfaces comprises a sectional partial area of a lateral surface of an imaginary section of a cone, wherein the lateral surface and the imaginary section of the cone tapers toward the front side of the shank,
the at least one centering surface of the basic body defines an outer surface of the central section of the basic body,
at least one driver extending outward from the central section of the basic body, said driver extending such that it is not parallel to the center axis;
at least one driving surface formed in the slot of the shank, the driving surface extending such that it is not parallel to the center axis;
the slot in the shank has at least one inner surface region shaped and configured to interact with the at least one centering surface, and the inner surface region of the slot is of corresponding shape to the centering surfaces,
the at least one centering surface extends along the cutting insert up to the end face of the basic body of the cutting insert.

2. The tool as claimed in claim 1, wherein the at least one driver has a respective driving surface and the slot in the shank includes a supporting surface inner surface region formed in the slot of the shank and configured to the respective driving surface.

3. The tool as claimed in claim 2, wherein at least one of the driving surfaces encloses an acute angle with a plane in which the center axis of the basic body of the cutting insert lies.

4. The tool as claimed in claim 3, wherein the basic body has two of the drivers and the drivers originate opposite one another from the central section, and
the respective driving surfaces of the two drivers converge in the direction of the front side of the tool.

5. The tool as claimed in claim 1, wherein the basic body has two of the drivers.

6. The tool as claimed in claim 5, wherein the drivers originate opposite one another from the central section.

7. The tool as claimed in claim 6, wherein the basic body of the cutting insert is centrically symmetrical relative to the center axis.

8. The tool as claimed in claim 1, wherein the cutting insert has a bearing surface opposite the end face thereof, the slot having a root in the shank, and the bearing surface of the insert is supported on the root of the slot.

9. The tool as claimed in claim 8, further comprising at least one of the bearing surface and the root of the slot is shaped to define at least one free space between the bearing surface and the root of the slot.

10. The tool as claimed in claim 8, further comprising at least one of the bearing surface and the root of the slot is shaped to define at least one free space between the bearing surface and the root of the slot,
   at least one coolant/lubricant passage in the shank located and configured to supply coolant/lubricant in the slot,
   a further coolant/lubricant passage in a contact region between an outer side of the cutting insert and the inner surface of the slot in the shank accommodating the cutting insert, the further coolant/lubricant passage being in fluidic connection with the at least one coolant/lubricant passage in the shank via the free space between the bearing surface of the cutting insert and the root of the slot in the shank.

11. The tool as claimed in claim 1, further comprising at least one coolant/lubricant passage in the shank located and configured to supply coolant/lubricant in the slot.

12. The tool as claimed in claim 11, further comprising at least one additional coolant/lubricant passage in the basic body of the cutting insert, the additional coolant/lubricant passage being in fluidic connection with the free space between the bearing surface of the cutting insert and the root of the slot in the shank.

13. A tool for machining workpieces, comprising:
   a shank having a front side, a slot formed in the front side of the shank, the slot being shaped and configured to accommodate a cutting insert;
   a cutting insert having a basic body having a central section with a center axis, the central section of the basic body having at least one convexly curved centering surface extending substantially along the direction of and being curved around the center axis, each of the centering surfaces comprises a sectional partial area of a lateral surface of an imaginary section of a cone, and the lateral surface and the imaginary section of the cone taper toward the front side of the shank;
   the at least one centering surface extends along the insert up to the end face of the basic body of the cutting insert;
   each of the sectional partial areas of the centering surfaces of the shank is followed around the center axis of the basic body by a portion of the central section without the centering surface;
   the at least one centering surface of the basic body defines an outer surface of the central section of the basic body,
   at least one driver extending outward from the central section of the basic body, said driver extending such that it is not parallel to the center axis;
   at least one driving surface formed in the slot of the shank, the driving surface extending such that it is not parallel to the center axis;
   the slot in the shank has a respective inner surface region that is shaped and configured to engage the sectional partial area of the at least one centering surface of the cutting insert;
   the basic body of the cutting insert having a first rotative position in the slot in the shank at which the sectional partial area of a lateral surface of the imaginary section of a cone overlaps and engages the inner surface region of the slot in the shank, and the sectional partial area of a lateral surface and the inner surface region of the slot are respectively so shaped, placed and positioned that in a first rotative position of the cutting insert in the slot, the overlap of the sectional partial area of the lateral surface and the at least one inner surface region retains the cutting insert in the slot, and in a second rotative position of the cutting insert in the slot, the sectional partial area of the lateral surface of the basic body of the shank does not overlap and engage the inner surface region of the at least one centering surface in the slot for freeing the cutting insert for being removed from the slot and also for being inserted into the slot.

14. The tool as claimed in claim 13, further comprising a supporting inner region formed in the slot of the shank positioned such that with the basic body of the insert in the first rotative position, the driver engages the supporting inner region while the tool is being used to machine a workpiece preventing rotation of the driver in the direction from the first rotative position to the second position, and holding the cutting insert in the second rotative position.

* * * * *